United States Patent [19]

Thiboutot

[11] 4,245,849
[45] Jan. 20, 1981

[54] COLLAPSIBLE SUPPORT DEVICES AND STRUCTURE

[75] Inventor: Robert Thiboutot, Quebec, Canada

[73] Assignee: Les Entreprises Rotot Ltee, Comte de Bellechasse, Canada

[21] Appl. No.: 960,444

[22] Filed: Nov. 13, 1978

[51] Int. Cl.³ .......................... A47C 4/00; B62B 13/16
[52] U.S. Cl. ..................................... 280/20; 248/436; 297/16; 297/45
[58] Field of Search ............................ 297/16, 42, 45; 248/188.6, 436; 211/201; 5/154; 280/20, 12 F, 11.37 J, 640, 646, 642, 42, 647, 649, 650

[56] References Cited

U.S. PATENT DOCUMENTS

| 430,703 | 6/1890 | Spahn et al. | 297/45 |
|---|---|---|---|
| 1,263,717 | 4/1918 | Stone | 297/45 |
| 1,268,631 | 6/1918 | Schaeffer | 297/45 |
| 1,580,557 | 4/1926 | McGrew | 297/45 |
| 1,921,460 | 8/1933 | Euring | 297/42 |
| 1,939,743 | 12/1933 | Warner | 297/45 |
| 1,942,112 | 1/1934 | McQuilkin | 297/42 |
| 1,963,835 | 6/1934 | Deland | 297/45 |
| 2,121,100 | 6/1938 | Rosenbaum | 5/154 |
| 2,133,047 | 10/1938 | Sheldon | 297/45 |
| 2,225,306 | 12/1940 | Kovats | 297/45 |
| 2,485,016 | 10/1949 | Rideout | 155/140 |
| 2,703,137 | 3/1955 | Bierman | 297/45 |
| 2,724,430 | 11/1955 | Garner | 297/42 |
| 2,766,813 | 10/1956 | Kay | 297/45 |
| 2,810,429 | 10/1957 | Lane et al. | 155/140 |
| 3,061,326 | 10/1962 | Rasmussen | 280/20 |
| 3,180,652 | 4/1965 | Johanson | 280/20 |
| 3,504,924 | 4/1970 | Nesbit | 280/20 |
| 3,736,021 | 4/1971 | MacLaren | 297/42 |
| 3,873,117 | 3/1975 | Perego | 280/642 |
| 3,968,991 | 7/1976 | MacLaren | 297/45 |
| 4,065,173 | 12/1977 | Gittings | 297/45 |

FOREIGN PATENT DOCUMENTS

| 14477 | 3/1882 | Canada | 297/16 |
|---|---|---|---|
| 193934 | 11/1919 | Canada | 280/20 |
| 199728 | 5/1920 | Canada | 280/20 |
| 202445 | 8/1920 | Canada | 280/20 |
| 239355 | 4/1924 | Canada | 297/16 |
| 246165 | 1/1925 | Canada | 280/20 |
| 257715 | 2/1926 | Canada | 297/16 |
| 749733 | 1/1967 | Canada | 297/16 |
| 381607 | 1/1908 | France | 5/154 |

Primary Examiner—David M. Mitchell
Attorney, Agent, or Firm—Fleit & Jacobson

[57] ABSTRACT

A collapsible support structure for supporting items, such as chair backs. The support structure, in an erect position, has two vertical members interconnected at their bottoms by a collapsible, preferably horizontal, member. Each end of the horizontal member is also pivotally connected to the other vertical member by a diagonal support member that extends between each end of the horizontal member and an upper portion of the opposite vertical member. When the structure is erect, the diagonal support members form an "X". Stiffening members, which are preferably generally vertical, are spaced from the vertical members and extend between the horizontal member and the diagonal support members. Both the horizontal member and the diagonal support members are formed of a plurality of pivotally interconnected links, at least one of which is modified to maintain the links in a desired angular position when the support structure is erected. Collapse of the support structure moves the vertical members towards each other to reduce the width of the structure. The collapsible support structure is combined with similar or other types of support structures to form folding devices.

22 Claims, 30 Drawing Figures

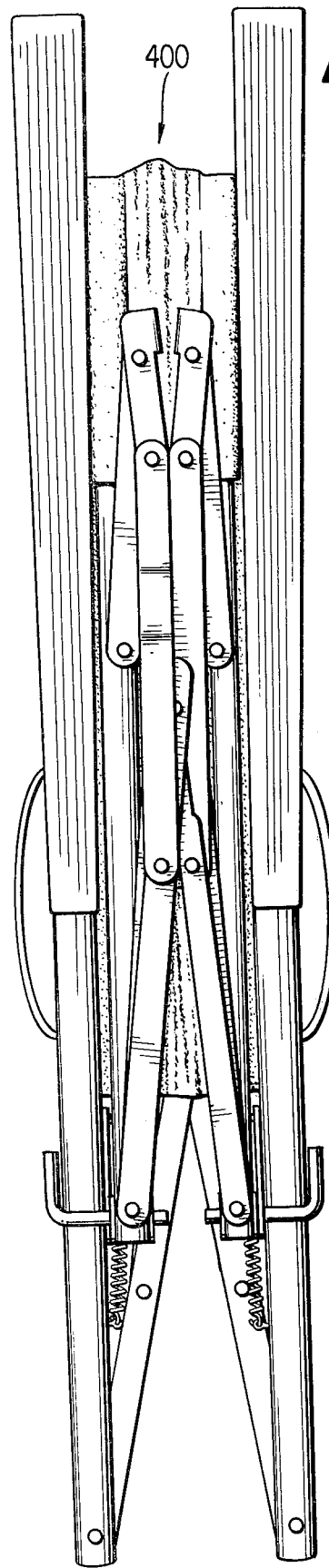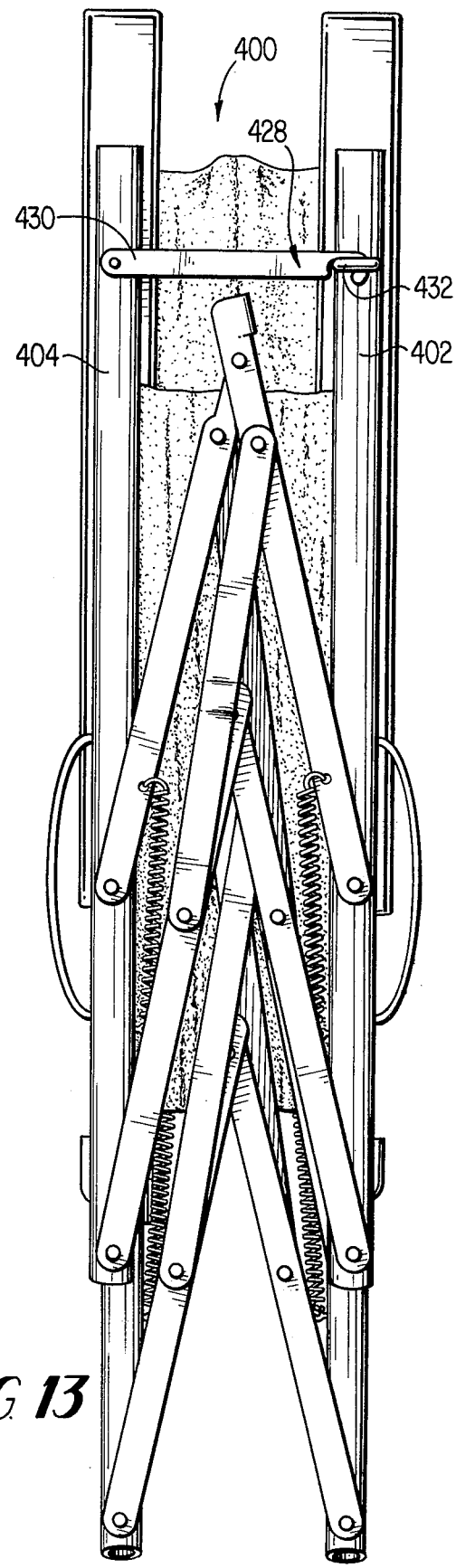

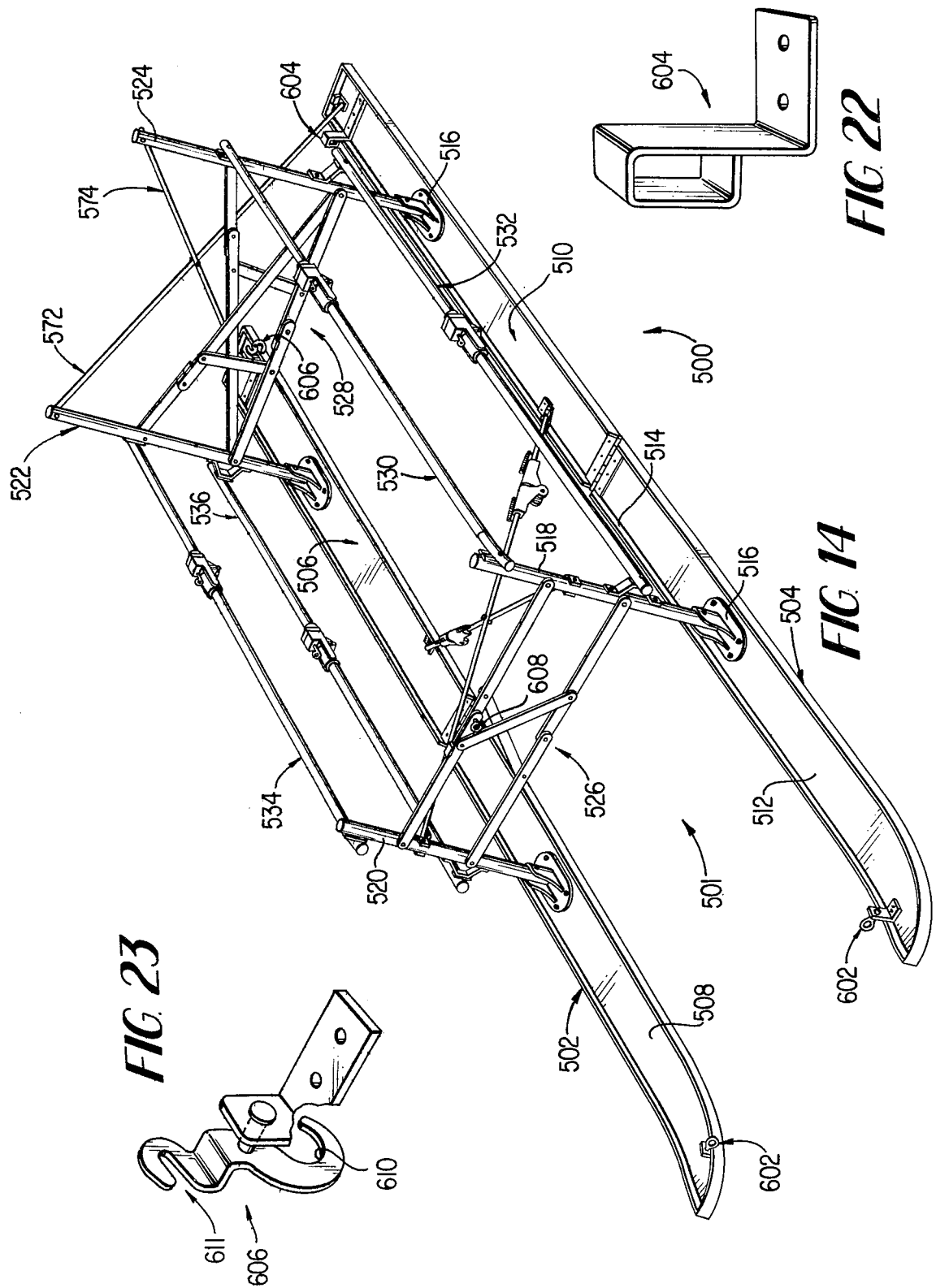

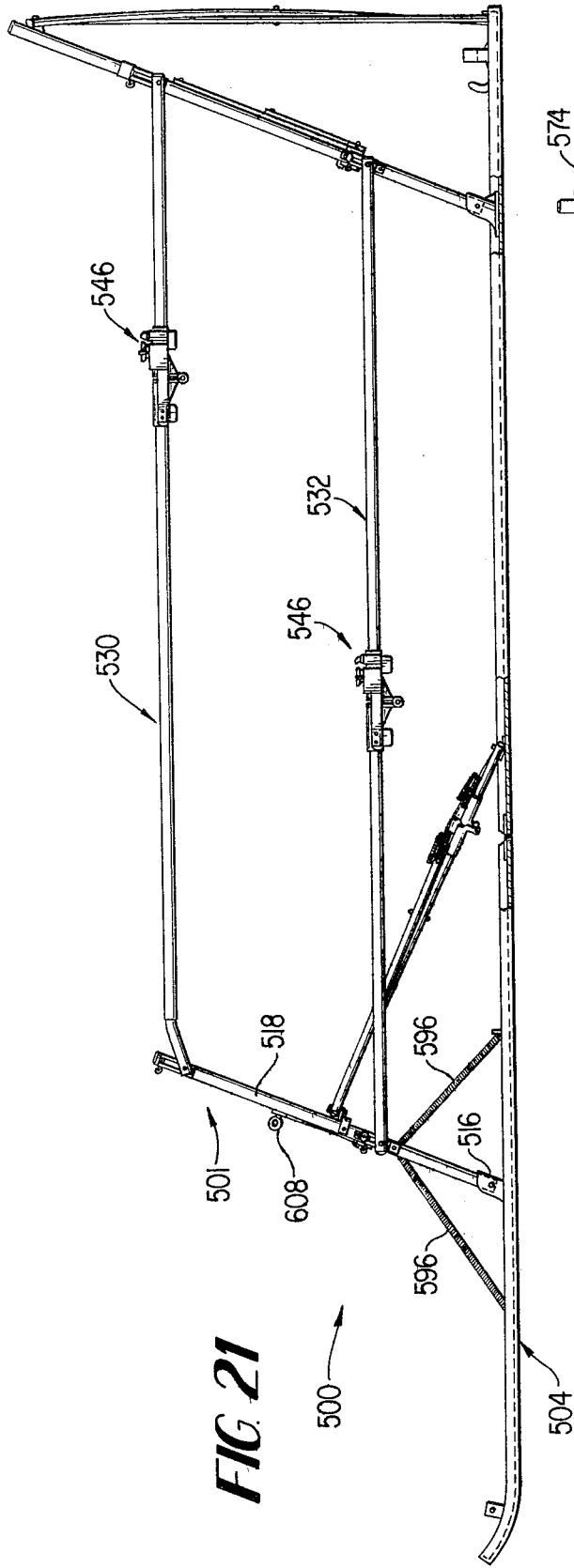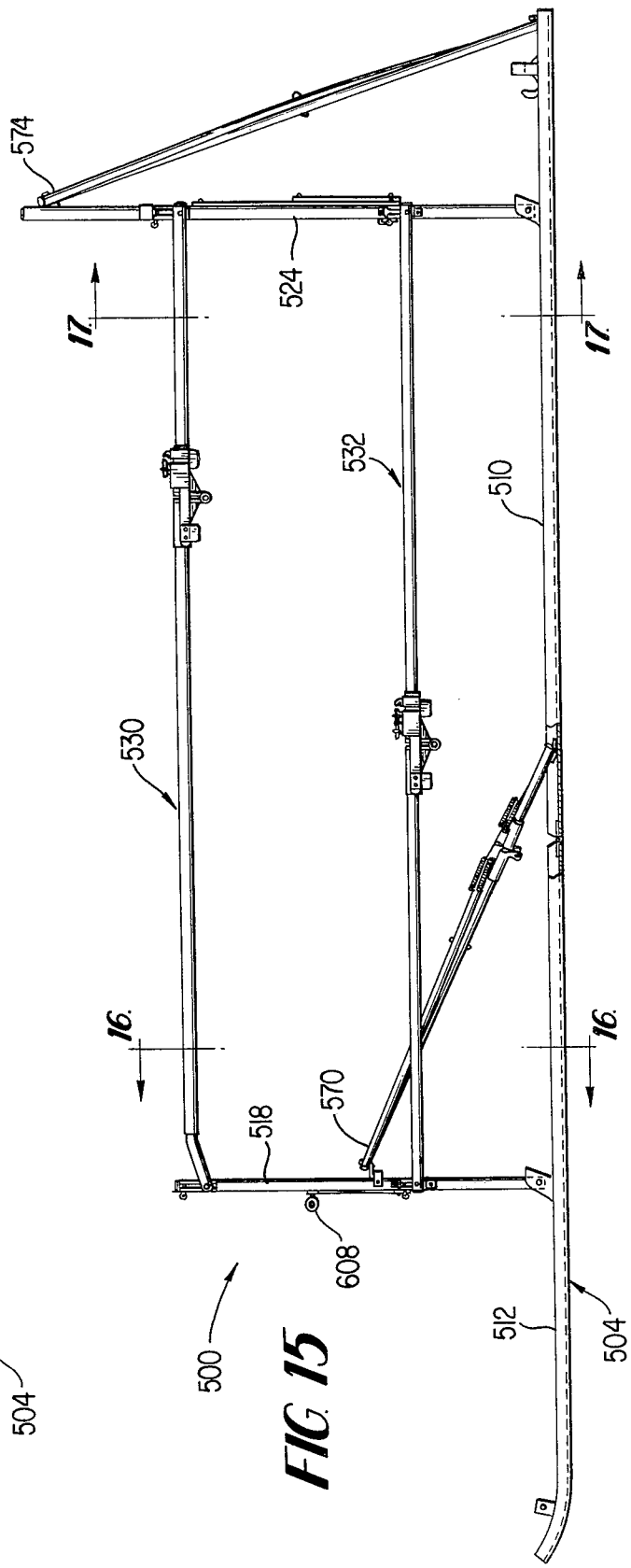

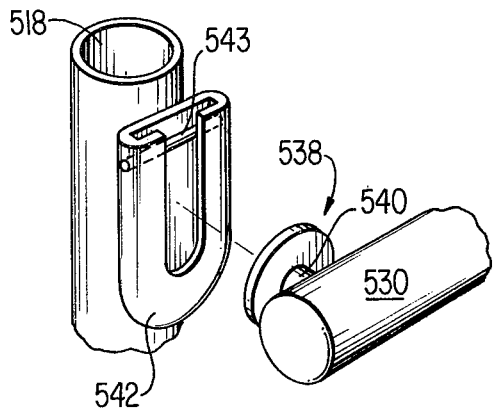
FIG. 24
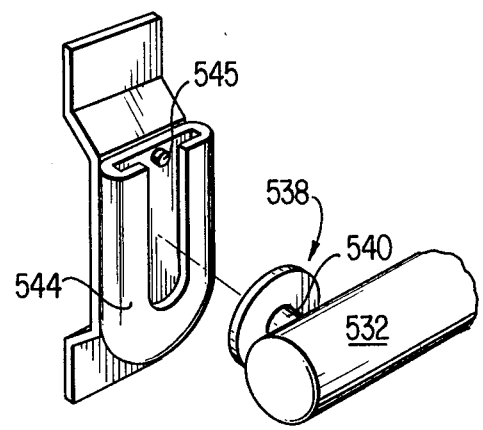
FIG. 25
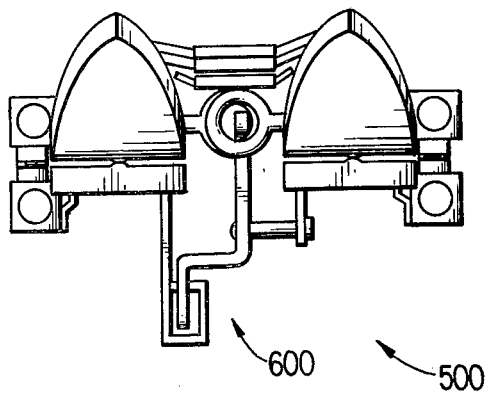
FIG. 26
FIG. 27
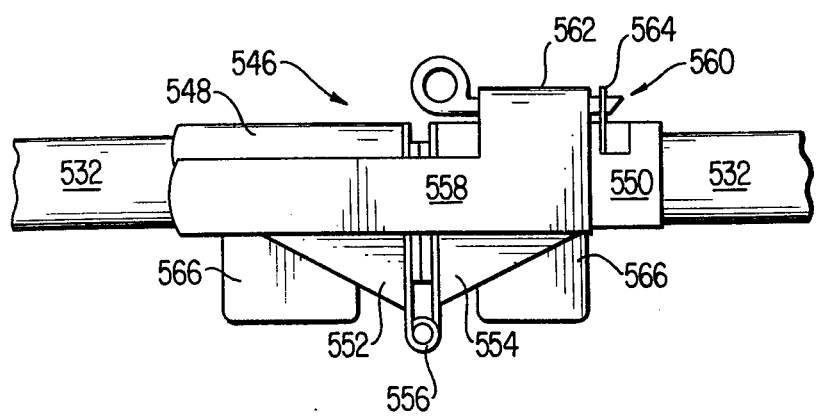

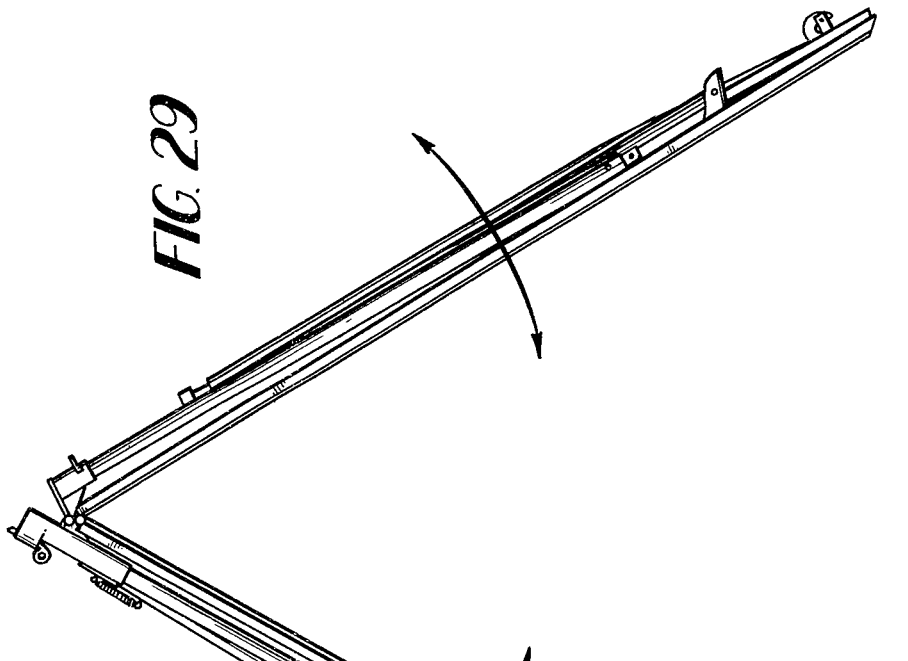
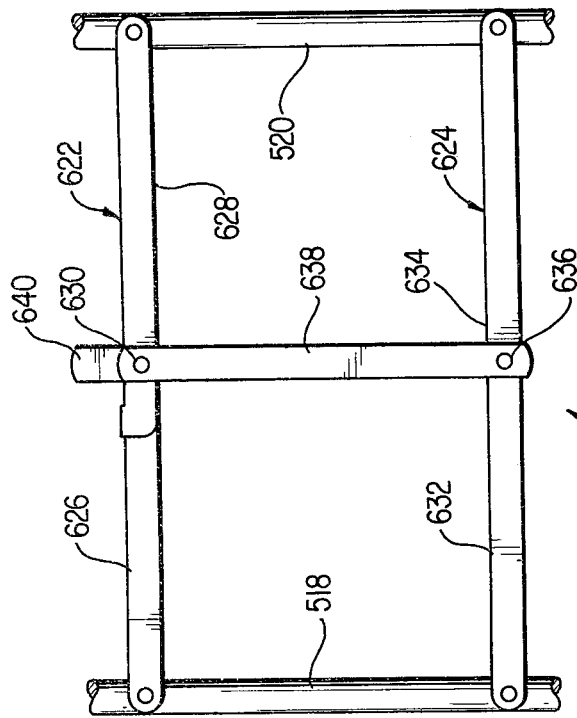

COLLAPSIBLE SUPPORT DEVICES AND STRUCTURE

BACKGROUND OF THE INVENTION

1. Field of the Invention

This invention relates to collapsible support structures. More specifically, the present invention relates to support structures that are collapsible to reduce their width. A plurality of such support structures are combined with similar or other types of support structures to form folding devices, such as chairs, shopping carts, and trailer covers.

2. Description of the Prior Art

Numerous types of collapsible structures are known to the prior art. For instance, U.S. Pat. No. 430,703 describes a portable chair having members interconnected by hinges. U.S. Pat. No. 2,766,813 describes a collapsible chair having vertical members interconnected by cross-diagonal members. U.S. Pat. Nos. 3,736,021 and 3,968,991 describe collapsible or folding wheelchairs.

Representative problems encountered with use of previously known foldable support structures include the need to use an excessive number of component parts, a limitation on the amount of size reduction obtainable with the collapsible structures, difficulty in moving the structures between collapsed and erect or supporting positions, and a lack of rigidity when the structures are in supporting positions.

SUMMARY OF THE INVENTION

Accordingly, it is an object of the present invention to provide an improved collapsible support structure that minimizes or eliminates problems encountered with previously known collapsible support structures.

It is a further object of the present invention to provide an improved collapsible support structure that requires a minimum number of component pieces.

A still further object of the present invention is to provide a collapsible support structure of improved construction that is adapted to be folded in extremely compact form, and that is strong and efficient in use.

Another object of the present invention is to provide an improved collapsible support structure that can be combined with other types of collapsible support structures to form improved foldable items and devices.

Still another object of the present invention is to provide folding chairs that can be readily collapsed or folded for carrying purposes, and can be easily opened up when required for use.

A still further object of the present invention is to provide a sled that can be readily collapsed and folded for carrying purposes, and can be easily opened up when required for use.

In accordance with the present invention, an improved collapsible support structure is provided that has two vertical members interconnected by a collapsible or foldable support mechanism in such manner that the vertical members are adjacent to each other in a collapsed or folded position, and are spaced from each other and held in a erected or supporting position.

The foldable support mechanism includes a foldable or collapsible substantially horizontal connecting member directly connected to lower portions of both of the vertical members. The ends of the connecting member are also connected to upper portions of the other vertical members by crossed diagonal support members. Thus, each end of the connecting member is pivotally connected to the other vertical member by 2 members. Further, the diagonal support members form a generally X-shape and are supported intermediate their ends by members that extend between the horizontal connecting and diagonal support members. An open area is provided above the diagonal support members so that there is little or no contact between the support structure and a user. Both the horizontal connecting and diagonal support members are formed from a plurality of interconnected links. At least one of the links includes a mechanism for maintaining a desired angular relationship between the links.

The collapsible support structure of the present invention may be combined with other types of collapsible support structures to form improved folding units or devices. For instance, an improved folding chair is formed by using the collapsible support structure of the present invention to define and support the back of the chair, and by using another type of collapsible support structure to define and form the sides and front of the chair. The open area formed above the crossed diagonal support members of the support structure of the present invention minimizes the possibility of contact between the back of a person seated in the chair and the support structure. Another or second type of collapsible support structure used with the chair is described in my copending application Ser. No. 960436, filed herewith. This support has two vertical members interconnected by a collapsible or foldable support mechanism in such manner that the vertical members are adjacent to each other in a collapsed or folded position, and are spaced from each other in an erected or supporting position. One embodiment of the foldable support mechanism used in the second type of collapsible support structure includes upper and lower foldable or collapsible connecting members, each connecting member having a first link or component member pivotally connected at one end to one of the vertical members, and a second link or component member pivotally connected at one end to the other of the vertical members. The first and second component members have end portions that overlap each other, and are pivotally interconnected. Preferably, at least one of the component members of the connecting members is modified to maintain the component members in a desired angular relationship with each other when the support structure is erected. For instance, one of the component members, in the region of overlap of the component members, includes a protruding tabular portion adapted to engage with the other component member. The tabular portion, when engaged with the other component member, prevents further movement of the component members with respect to each other, thereby maintaining a desired angular relationship, preferably horizontal or substantially horizontal, between the component members.

The aforementioned embodiment of the foldable support mechanism used in the second type of collapsible support structure also includes diagonal support members for interconnecting the upper and lower connecting members. One of the diagonal support members connects the first component member of the upper connecting member with the second component member of the lower connecting member, while the other diagonal support member interconnects the second component member of the upper connecting member with the first component member of the lower connecting member.

The support members are positioned on opposite sides of the component members so that they do not interfere with the folding of the support mechanism.

In order to avoid interference between the different members of the support mechanisms used with the different support structures when the folding chair is collapsed, a variable number of spacers or washers are provided at the various points of interconnection of the members. The number and/or size of the spacers provided is determined by the width and number of component members that are positioned between a particular point of connection when the structure is collapsed. Alternatively, or in addition, the members have tapered or bent shapes to facilitate movement.

It will be appreciated that adjacent support mechanisms utilize the same vertical members. Thus, the vertical members interconnected by the foldable support mechanism of the present invention are also used by the foldable support mechanism of the second type of collapsible support structure. In this manner, both the sides, front, and back of the chair are collapsible to reduce the size of the chair. The collapsible structure of the present invention is particularly well adapted to be used in the back portion of a chair or other human supporting structure, because there is no top horizontal member to cause discomfort to a person sitting in such a chair or other human supporting structure. Also, some or all of the vertical members are appropriately modified to facilitate fastening of a seat material, such as canvas, to the folding chair.

The collapsible support structure of the present invention can also be combined with the second type or other types of collapsible support structures to form a collapsible sled that is adapted to be towed by a human, a snowmobile or other suitable prime mover. The collapsible sled can also be modified to form a self-powered vehicle. The collapsible support structure of the present invention forms the back of the sled, while the second or other type of collapsible support structure forms the front of the sled. Other details of the sled will be discussed in more detail hereinafter.

The invention and its objects and advantages will become more apparent in the detailed description of the preferred embodiments presented below.

BRIEF DESCRIPTION OF THE DRAWINGS

In the detailed description of the preferred embodiments of the invention presented below, reference is made to the accompanying drawings, in which:

FIG. 12 is a top view of the embodiment of FIG. 10 in a totally collapsed and locked position;

FIG. 13 is a bottom view of the embodiment of FIG. 10 in a totally collapsed and locked position;

FIG. 14 is a perspective of one embodiment of a folding sleigh, in an erect position, using support structures of the type illustrated in FIGS. 1 and 3;

FIG. 15 is a side elevation of the embodiment of FIG. 14 in a partially collapsed position;

FIG. 21 is a side elevation of the embodiment of FIG. 14;

FIG. 22 is an enlarged perspective view of a component part of the embodiment illustrated in FIG. 14;

FIG. 23 is an enlarged perspective view of another component of the embodiment illustrated in FIG. 14;

FIG. 24 is an enlarged, exploded illustration of two components of the embodiment illustrated in FIG. 14;

FIG. 25 is an enlarged, exploded illustration of two other components used in the embodiment of FIG. 14;

FIG. 26 is a front view of the embodiment of FIG. 14 in a totally collapsed, folded, and locked position;

FIG. 27 is an illustration of one embodiment of a hinge used with the embodiment illustrated in FIG. 14;

FIG. 28 is an illustration of another embodiment of a hinge used with the embodiment illustrated in FIG. 14;

FIG. 29 is a side elevation of the embodiment of FIG. 14 in a totally collapsed, partially folded position; and FIG. 30 is a plan view of a modified support mechanism usable with the embodiment illustrated in FIG. 14.

DESCRIPTION OF THE PREFERRED EMBODIMENTS

Because collapsible structures and collapsible support devices are well known, the present description will be directed in particular to elements forming part of, or cooperating more directly with, the present invention. Elements not specifically shown or described herein are understood to be selectable from those known in the art.

Figure 1:
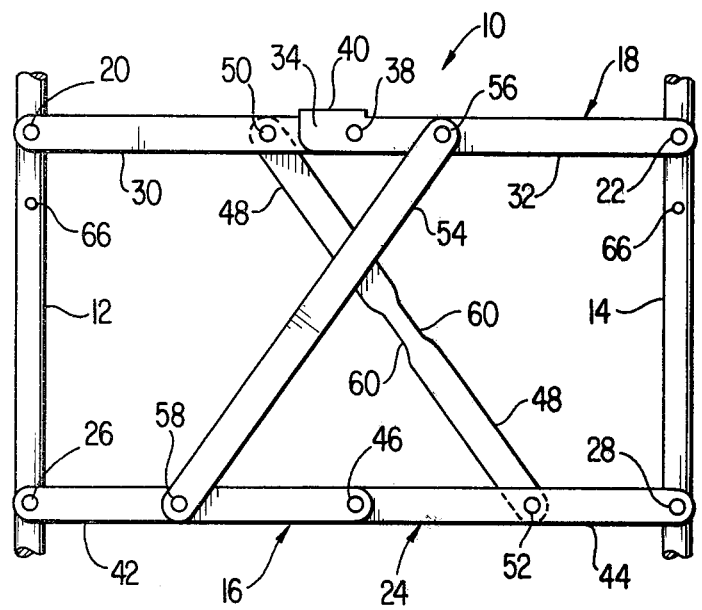
FIG. 1 is a plan view of a collapsible support structure, in an erect position, usable with the support structure of the present invention.

Referring now to the drawings wherein the same reference numerals are used to identify similar components in the different figures, and referring to FIG. 1 in particular, a collapsible support structure, which is generally designated 10, usable with the collapsible support structure of the present invention, is illustrated. The structure 10, in an erect or supporting position, has a pair of vertical members or posts 12 and 14 connected to each other by a collapsible support mechanism, which is generally designated 16.

Figure 2:
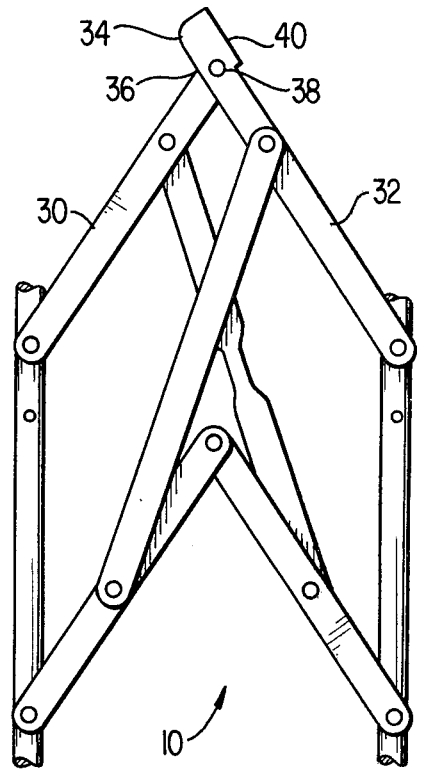
FIG. 2 is a plan view of the support structure of FIG. 1 in a partially collapsed, or partially erect, position.

The mechanism 16 has an upper foldable connecting member, generally designated 18, pivotally connected at 20 to the vertical member 12 and pivotally connected at 22 to the vertical member 14. A lower foldable connecting member, generally designated 24, is pivotally connected at 26 and 28 to the vertical members 12 and 14, respectively. The upper member 18 is comprised of a plurality of pivotally interconnected links or component members, two, designated 30 and 32, being illustrated. These links have distal ends connected to the vertical members and proximal ends 34 and 36, respectively, overlapping each other and connected by a pivotal connection 38. As illustrated in FIG. 2, the interconnected members 30 and 32 form a knee joint that is adapted to fold upwardly during the movement of the support structure 10 from an erected to a collapsed position. Also, as illustrated in FIG. 1, the end of one of the links 30, 32, which is designated 34, includes a protruding tabular portion or shoulder lock 40 that is adapted to engage with the end of the other component member to limit the downward swing or movement of the members 30, 32, thereby preventing collapse of vertical members 12 and 14 towards each other. Preferably, the portion of end 36 engaged by lock 40 is cutaway or recessed to receive the lock. In one embodiment, the lock 40 holds the members 30 and 32 in a horizontal position. In another embodiment, the lock 40 engages end 36 in such manner that connection 38 is lower than connections 20 and 22. With this embodiment, the likelihood of inadvertent release of lock 40 is reduced.

The lower foldable connecting member 24 is formed of a plurality of links or component members, two, designated 42 and 44, being illustrated. The links 42, 44 have distal ends connected to the vertical members 12 and 14 and proximal ends overlapping and interconnected to each other by a pivotal connection 46. Preferably, the pivotal connections 38 and 46 are located halfway between the vertical members 12 and 14 when the structure 10 is in an erect position.

The upper and lower foldable connecting members 18 and 24 are interconnected by diagonal support members or cross bars that form an "X" when the support structure is in a fully opened or erect position. A first of the diagonal support members, which is designated 48, is pivotally connected at 50 to the first link 30 of the upper connecting member and is pivotally connected at 52 to link 44 of the lower connecting member. Similarly, a second diagonal support member 54 extends between a connection point 56 on member 32 and a connection point 58 on member or link 42.

The cross bars 48 and 54, when in the fully opened position, provide parallelism between the upper and lower sets of horizontal links, thereby preventing collapse of the vertical members 12, 14. Also, use of the cross bars provides a strong and safe support mechanism.

It will be appreciated that movement of the support structure from an erect to a collapsed position, or vice versa, requires movement on four different levels. Support member 54 moves on an inner or first level. Links 32 and 42 move on an intermediate or second level. Links 30 and 44 move on another intermediate or third level. Support member 48 moves in an outer or fourth level. Since the members are not necessarily planar, the surfaces formed by the movement of the members might or might not be planar. In order to minimize the possible interference between the various component members of the support structure 10, numerous modifications have been made to the component members. For instance, a recess 60 is provided on both sides of a lower portion of the cross bar 48 to provide clearance between the cross bar and the connection 20 on vertical member 12, and the connection 22 on vertical member 14. Also, spacers or washers having a width equal to the thickness of the diagonal support members 48, 54 are incorporated in the pivotal connections 20 and 26. In a similar manner, spacers which are either a single spacer or a plurality of spacers equal to the combined width of the diagonal support members 48, 54, are associated with the pivotal connections 22, 28 attached to vertical member 14. Other possible modifications include tapering selected portions of the components instead of or in addition to providing recesses and bending selected portions of the component members to provide the clearance required between the various levels. It will be appreciated that numerous combinations of the preceding can be used to provide the required clearances.

The vertical supports 12 and 14 are provided with a plurality of devices adapted to connect material, such as canvas, netting, or plastic sheet material to the posts. FIG. 1 illustrates projecting support pins 66; however, it will be appreciated that holes drilled in the posts 12, 14, indentations formed in the posts, hooks attached to the posts and other suitable methods can be used to attach material to the posts.

Figure 3:
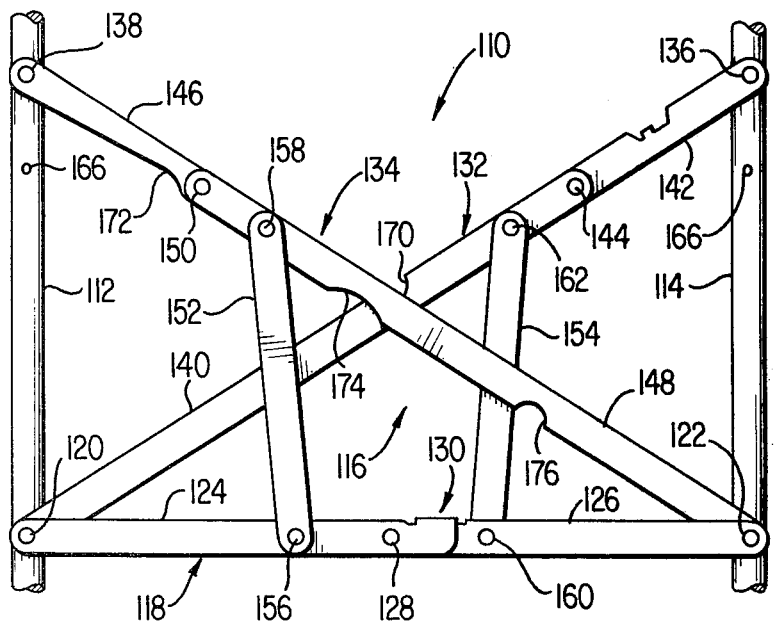
FIG. 3 is a plan view of a collapsible support structure according to the present invention, in an erect position.
Figure 4:
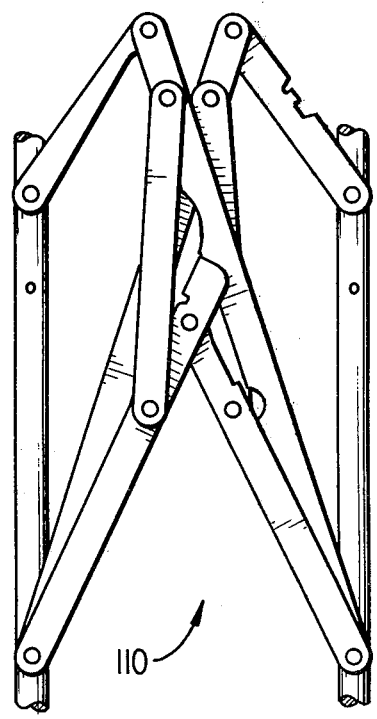
FIG. 4 is a plan view of the support structure of FIG. 3 in a partially collapsed, or partially erected, position.

Referring now to FIGS. 3 and 4 of the drawings, the collapsible support structure according to the present invention will be described. The collapsible support structure, which is generally designated 110, has two vertical members or posts 112 and 114 interconnected by a collapsible support mechanism, which is generally designated 116. The posts 112, 114 can be the same posts 12, 14 used with the support structure illustrated in FIGS. 1 and 2.

The support mechanism 116 has a connecting member, generally designated 118, connected to lower portions of the posts 112 and 114 at 120 and 122, respectively. In the embodiment illustrated in FIG. 3, the connecting member 118 is horizontal when the support structure 110 is in an erected or supporting position. In another embodiment (not shown), the connecting member 118 forms a generally V-shape when the support structure is erected.

The connecting member 118 is formed of two links or component members 124 and 126 pivotally interconnected at 128. Preferably, a mechanism, generally designated 130, is provided for holding the links in a desired angular relationship with each other when the support structure 110 is in an erected position. For instance, an end portion of link 126 is cutaway to form a seat for a tabular portion protruding or extending from link 124.

A diagonal support member, which is generally designated 132, interconnects one end of connecting member 118 with post 114, while a similar diagonal support member, which is generally designated 134, interconnects the other end of connecting member 118 with post 112. As illustrated, support member 132 extends between pivotal connection 120 and a pivotal connection 136 on post 114, while support member 134 extends between pivotal connection 122 and a pivotal connection 138 on post 112. This method of connection is preferred because fewer assembly operations are required; however, the support members could be connected to other portions of the posts. In an erected position of the support structure, the support members 132, 134 form a generally X-shape. The support member 132 is formed of a plurality of interconnected links, two, designated 140 and 142, being illustrated. Similarly, support member 134 is formed of a plurality of interconnected links, two designated 146 and 148, are illustrated. Connection devices 144 and 150 are provided for interconnecting the links of support members 132 and 134, respectively. One of the support members preferably has a protruding tabular portion that contacts one of the posts during collapse of the support mechanism to limit relative movement between the post and the support member.

Support members 152 and 154 are provided for transmitting a vertical force exerted on the support members 132, 134 to the horizontal member 118. The support member 152 is pivotally connected to link 124 at a connection point 156 and is pivotally connected to link 148 at a pivotal connection point 158. The support member 154 is pivotally connected at 160 to the link 126 and is pivotally connected to the link 140 at a connection point 162. Also, support member 154 has a ring or other suitable gripping device attached thereto to facilitate initial upward movement of the horizontal member 118.

As illustrated in FIG. 3, the posts 112 and 114 are provided with a plurality of support or connection devices 166, similar to the devices 66 used with the structure illustrated in FIG. 1, for attaching canvas or other suitable material to the posts. It will be appreciated that other devices, such as sliding sleeves, holes drilled radially through the posts and other protruding devices can be used to connect, support, or attach materials to the posts 112 and 114.

To facilitate collapse of the support structure, various components of the structure are modified to reduce interference between the components while the structure is being moved to a collapsed position. For instance, link 140 includes a cutaway portion or notch 170; link 146 has a tapered or shaped portion 172; link 148 has notches or cutaway portions 174 and 176. Further, spacers (not shown) are provided at one or more of the connection points to facilitate movement of the component members past the connection points.

From FIGS. 2 and 4 of the drawings, it will be appreciated that the posts 12, 14 and 112, 114 are movable between an erected or supporting position in which the posts, which will hereinafter be referred to as posts 12 and 14, are positioned spaced apart from each other and a collapsed position in which the distance between the two vertical posts is greatly reduced. In the erected position, the shoulder lock 40 locks the support mechanism 16, or the locking mechanism 130 locks the support mechanism 116, so that the posts 12 and 14 are releasably locked in the erected position.

Figure 5:
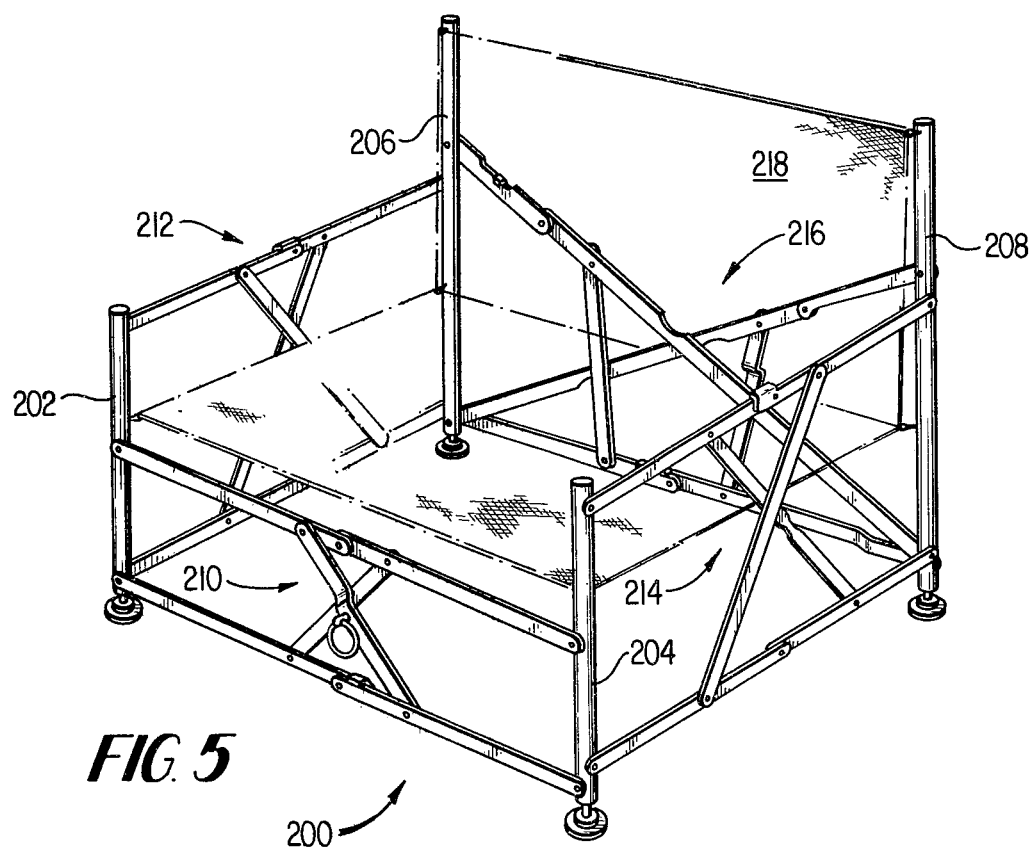
FIG. 5 is a perspective view of one embodiment of a folding chair, in an erect position, using collapsible support structures of the type illustrated in FIGS. 1 and 3.
Figure 6:
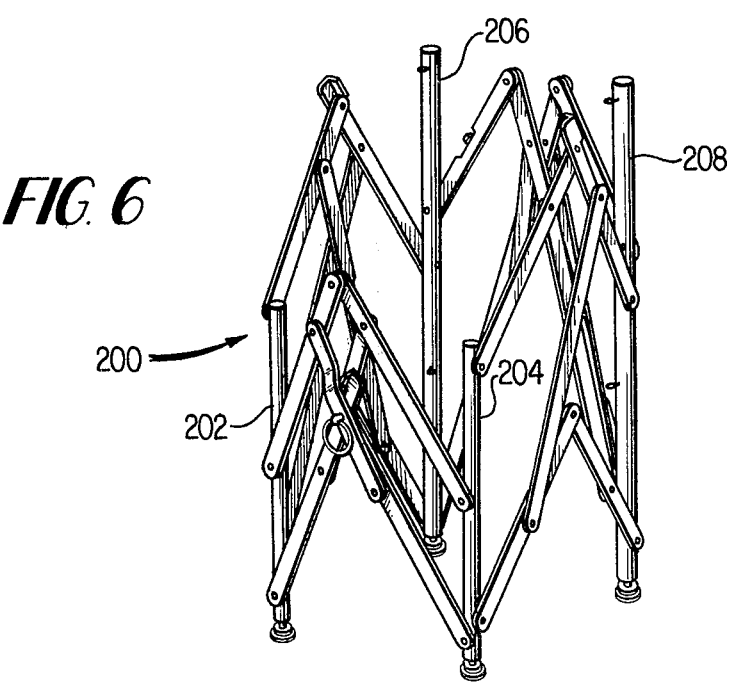
FIG. 6 is a perspective view of the embodiment of FIG. 5 in a partially collapsed, or partially erect, position.

Referring now to FIGS. 5 and 6, a collapsible chair, which is generally designated 200, is illustrated. The chair 200 has vertical posts 202, 204, 206 and 208 interconnected by support structures of the type described in conjunction with FIGS. 1 and 3. Specifically, the front of the chair is formed by a support structure 210 interconnecting posts 202 and 204. The sides of the chair are formed by a support structure 212 interconnecting the posts 202 and 206 and a support structure 214 interconnecting posts 204 and 208. The support structures 212 and 214 forming the sides of the chair 200 are higher than the support structure 210 forming the front of the chair. Also, the support structures 210, 212, and 214 are similar to the previously discussed support structure 10. The back of the chair is formed by a support structure 216, which is similar to the previously discussed support structure 110, which interconnects the posts 206 and 208. A support structure of the type illustrated in FIGS. 3 and 4 is used to form the back because the support structure does not have an upper horizontal member that might cause discomfort to a user of the chair. Also, canvas or other suitable seating material 218, which is partially cutaway to show features of the support structures, is connected in a previously discussed manner to the posts 202, 204, 206 and 208.

As can be seen from FIG. 6, the support mechanisms interconnecting the vertical posts are collapsible in order to reduce the length and width of the chair. Thus, the chair 200 is movable between an erected, supporting position and a collapsed position in which the chair forms a compact, easily transportable package.

Figure 7:
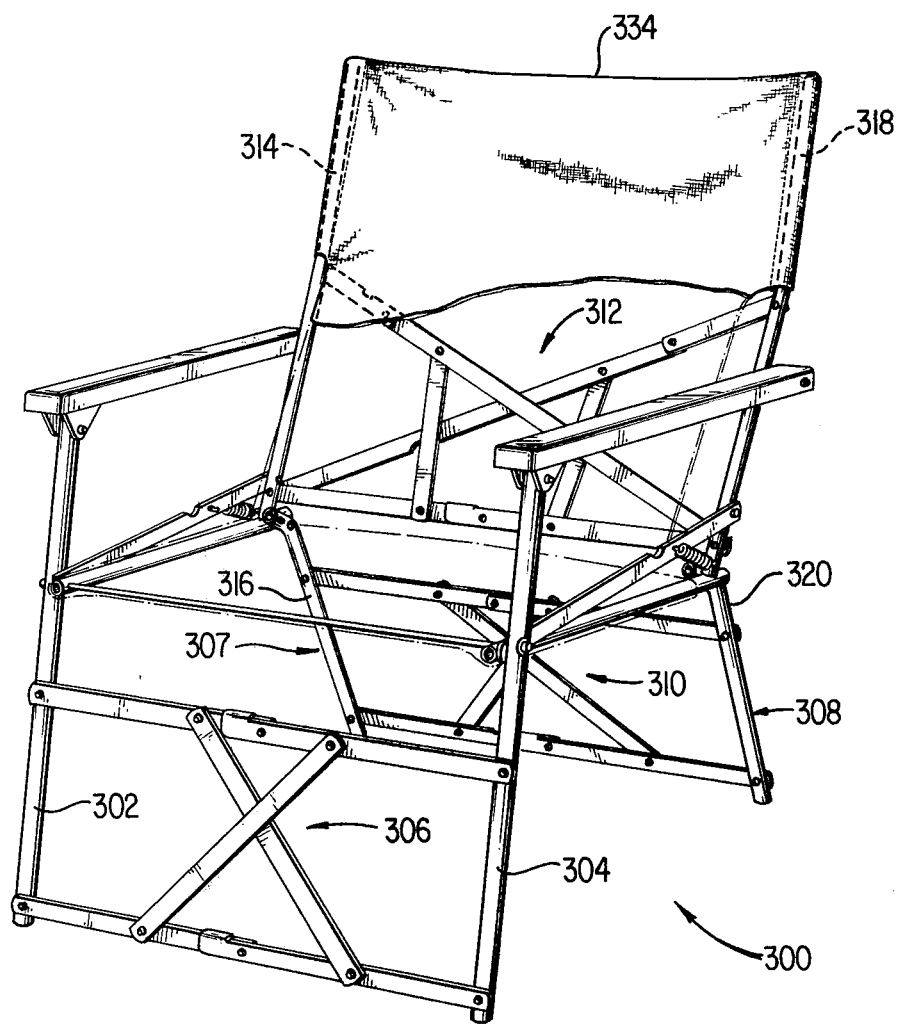
FIG. 7 is a perspective view of another embodiment of a folding chair, in an erect position, using collapsible support structures of the type illustrated in FIGS. 1 and 3.
Figure 9:
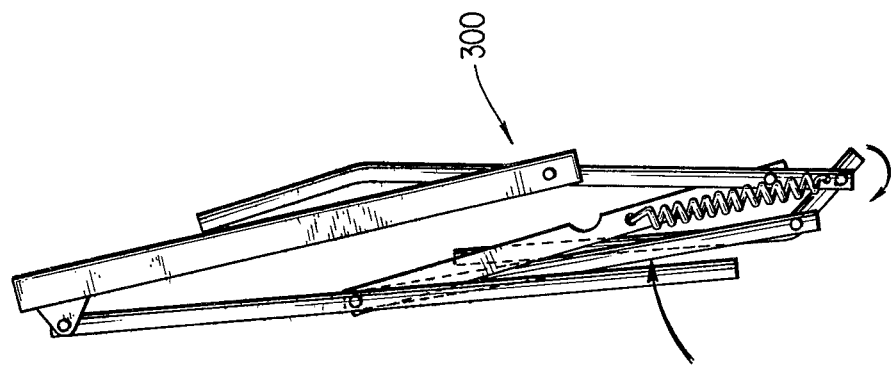
FIG. 9 is a side elevation of the embodiment of FIG. 7 in a totally collapsed position.
Figure 8:
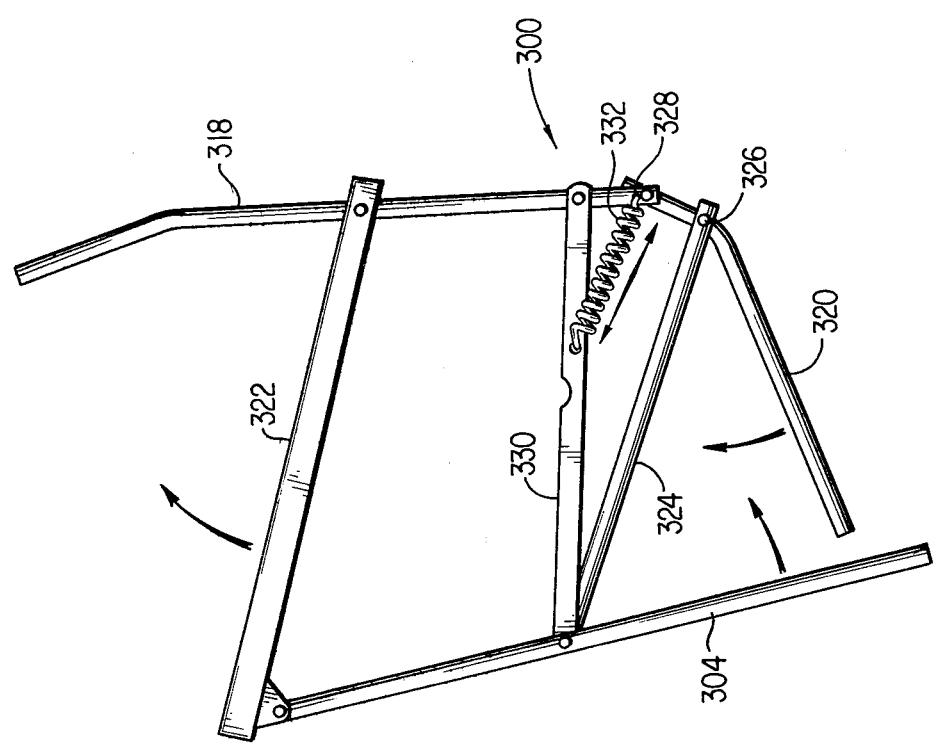
FIG. 8 is a side elevation of the embodiment of FIG. 7 in a partially collapsed, or partially erected, position.

Referring now to FIGS. 7-9, another embodiment of a collapsible folding chair using the support mechanisms of FIGS. 1 and 3 is illustrated. The front of the chair, which is generally designated 300, has upstanding members 302 and 304 having bottom portions interconnected by a support mechanism 306. The back of the chair is formed of upstanding members 307 and 308 having lower portions interconnected by a support mechanism 310 and upper portions interconnected by a support mechanism 312. Since the support mechanisms 306 and 310 are similar to the previously discussed support mechanism 16 and since the support mechanism 312 is similar to the previously discussed support mechanism 16, further discussion of these support mechanisms is not considered necessary.

Referring now to FIG. 7, it can be seen that the member 307 is formed of an upper member 314 pivotally connected to a lower member 316. The member 308 is similarly formed of interconnected members 318 and 320. During collapse of the chair 300, the members 302, 304 and the members 316, 320 are moved towards each other, thereby reducing the overall height of the chair.

Both sides of the chair 300 are similarly constructed, hence only one side will be described in detail. The right side of the chair, as viewed in FIG. 8, has an arm member 322 pivotally connected to the top of member 304 and pivotally connected to a mid-portion of member 318. A lower member 324 has one end pivotally connected to a mid-portion of member 304 and the other end pivotally connected to member 320 at a point 326 spaced from the point of connection 328 of members 318 and 320. It should be noted tht the member 320 has an arcuate shape between the points 326 and 328. A diagonal member 330 interconnects member 304 and member 318. A spring 332 is interconnected between the diagonal member 330 and the member 318 in such manner that the spring assists movement of the member 320 from the collapsed to the erected position of the chair.

Referring now to FIG. 9, the chair 300 is illustrated in a totally collapsed position. It is to be noted that both the height and width of the chair have been significantly reduced from that of the erected chair. Further, it is to be noted that the support mechanisms 306 and 310 have been collapsed in different directions. It is also to be noted that a portion of the material 334 forming the seat and back of the chair has been slid over the front of the lower members forming the sides of the chair and another portion has been slid over portions of members 314 and 318 forming the tops of the chairs. Thus, with this embodiment, there is no need to modify the vertical members to provide mechanisms for attaching seat material to the chair.

Referring now to FIGS. 10 to 13, another embodiment of a collapsible folding chair using the support mechanisms of FIGS. 1 and 3 is illustrated. The chair, which is generally designated 400, is a conventional folding chair that has been modified to reduce its width in a collapsed condition and to facilitate its transportation when collapsed.

Figure 10:
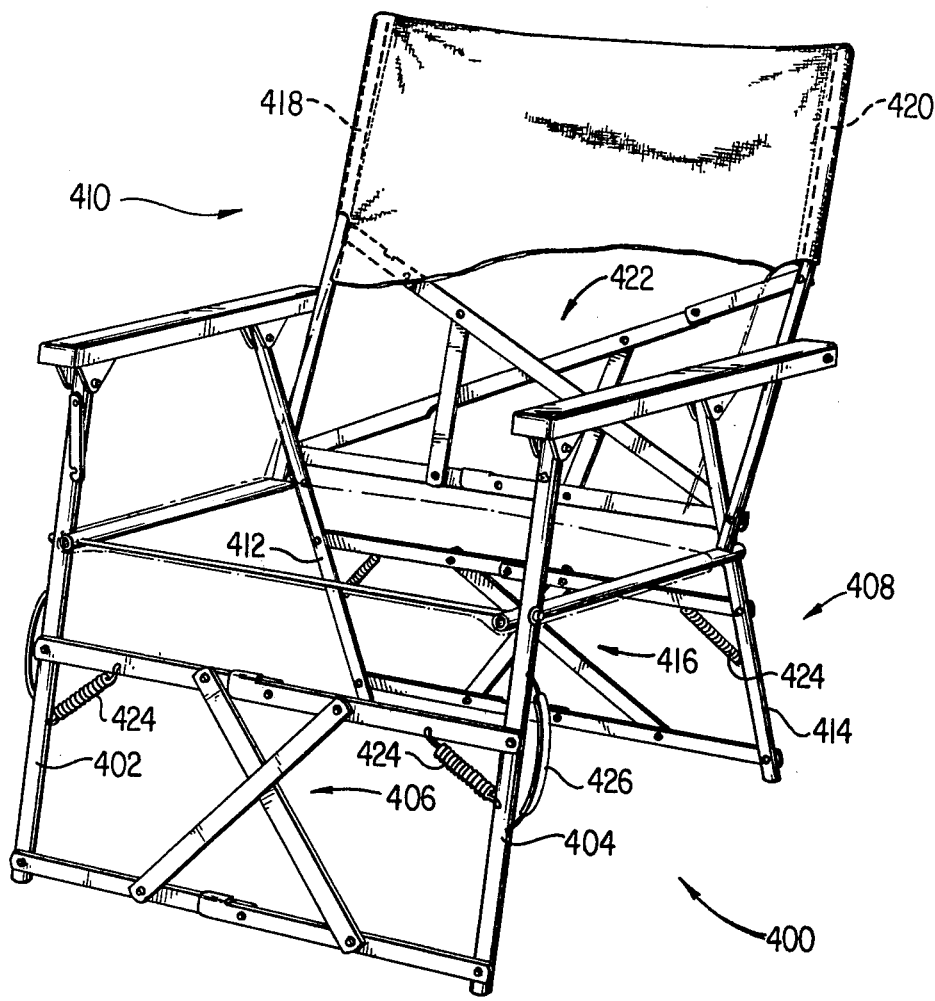
FIG. 10 is a perspective view of still another embodiment of a folding chair, in an erect position, using collapsible support structures of the type illustrated in FIGS. 1 and 3.
Figure 11:
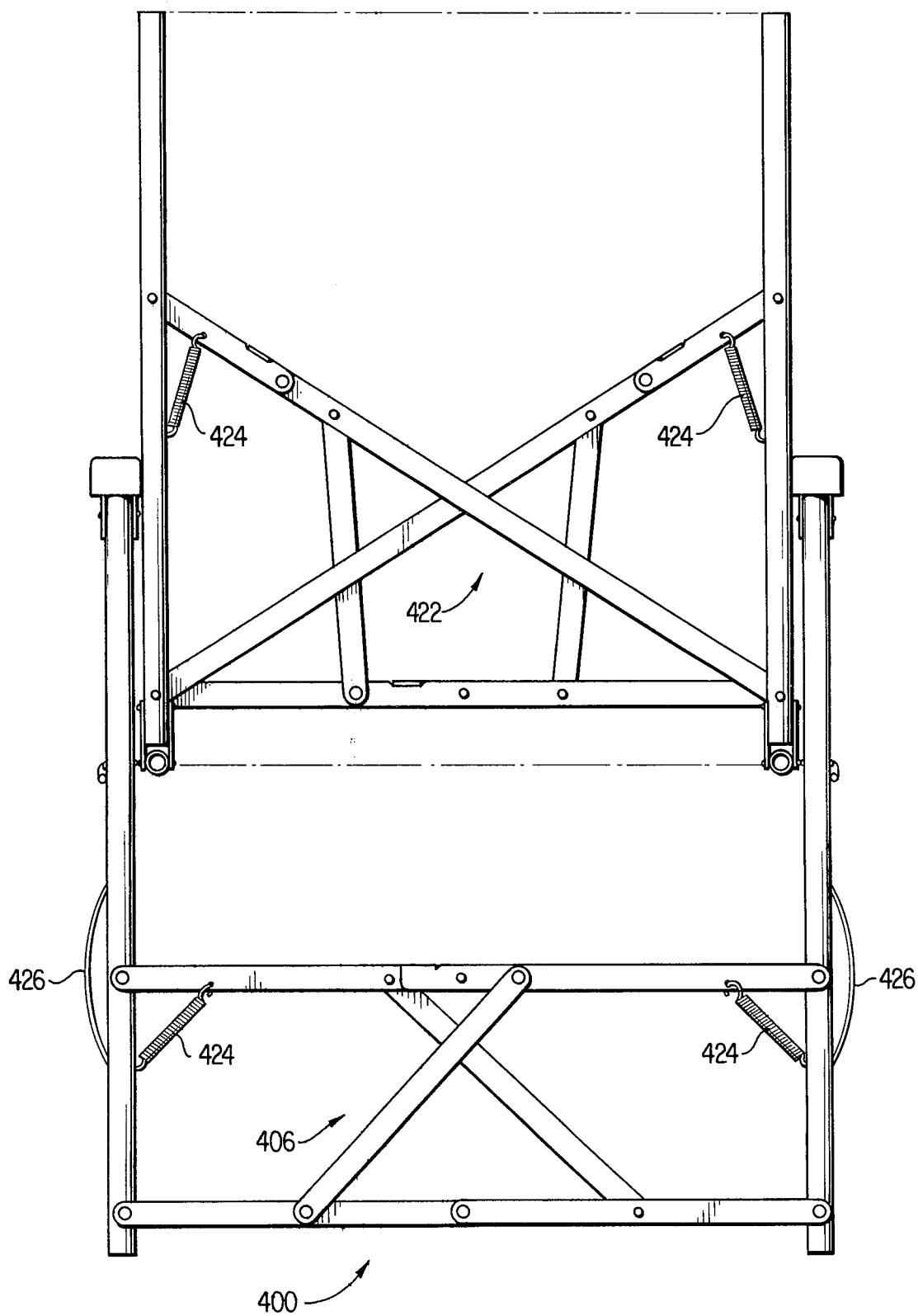
FIG. 11 is a plan view of the back of the embodiment of FIG. 10.
Figure 16:
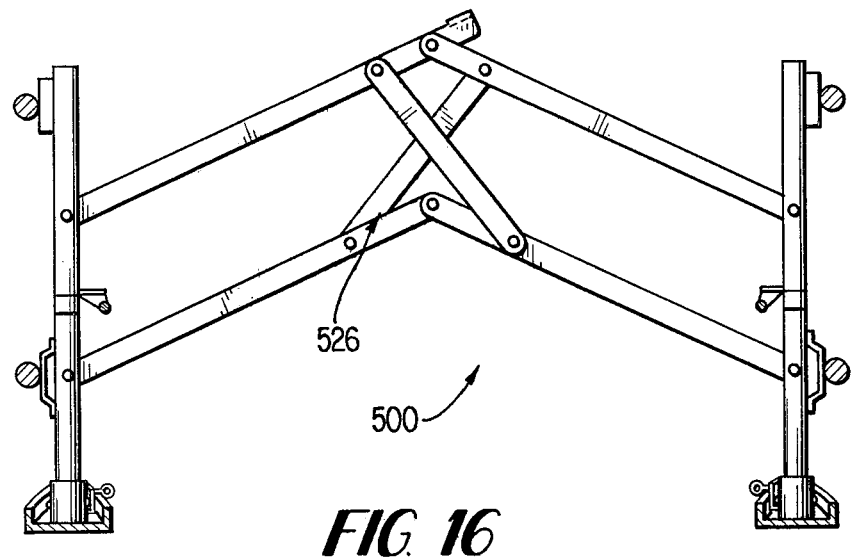
FIG. 16 is a cross-section taken along line 16—16 of FIG. 15.
Figure 17:
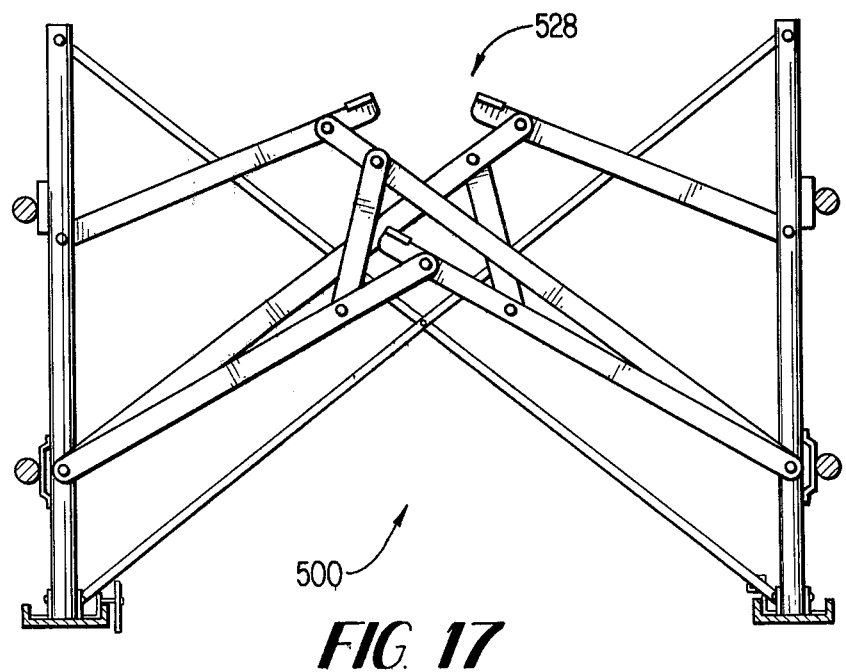
FIG. 17 is a cross-section taken along line 17—17 of FIG. 15.

As illustrated in FIG. 10, the chair 400 has front upstanding members 402 and 404 interconnected by a support mechanism 406 of the type previously discussed in connection with FIG. 2. The back of the chair has a lower portion, which is generally designated 408, and an upper portion, which is generally designated 410. The lower portion 408 is formed of upstanding members 412 and 414 interconnected by a support mechanism 416, which is similar to support mechanism 406. Upper portion 410 has upstanding members 418 and 420 which are interconnected by a support mechanism 422. The support mechanism 422 is similar to the support mechanism previously discussed in connection with FIG. 3. One or more springs 424 are positioned between components of the support mechanisms and the upstanding members to facilitate movement of the chair 400 from a collapsed to an erected position. A carrying handle 426 is attached to one of the upstanding members, for instance member 404, to facilitate carrying of the collapsed chair. Also, since the springs 424 bias the collapsed chair towards an erected position, a locking mechanism, which is generally designated 428, is provided to hold the chair in a collapsed condition. As illustrated in FIG. 13, the locking mechanism 428 has a hook 430 pivotally mounted on member 404 and an eye 432 mounted on member 402. Engagement of hook 430 with eye 432 holds the chair 400 in a collapsed condition. As can be seen from FIGS. 12 and 13, the collapsed chair forms a compact, easily transportable package.

Also, in one embodiment of the folding chair 400 (not illustrated), the support members for the diagonal support members and the diagonal support members used in the support mechanism 422 are bent away from the posts 418 and 420 to increase the amount of clearance between the support mechanism 422 and the back of a person seated in chair 400.

Referring now to FIGS. 14 to 29, an embodiment of a folding collapsible sled, sleigh, sledge or similar structure using the support mechanisms of FIGS. 1 and 3 is illustrated. The sled, which is generally designated 500, is movable between an erected position, as illustrated in FIG. 14, and a collapsed and folded position, as illustrated in FIG. 26.

Referring now to FIG. 14, the sled 500 has a collapsible and foldable structure, generally designated 501, supported by a first runner, which is generally designated 502, and a second runner, which is generally designated 504. The first runner 502 is formed of hingedly connected members 506 and 508, while the second runner 504 is formed of hingedly connected members 510 and 512. Inner edges of the runners 502 and 504, at least in the region of their hinged connection, contain upstanding ridges 514. Two brackets 516 are mounted on the top surface of each of the runners 502 and 504 for connecting the foldable structure 501 to the runners. Each of the brackets has a cutaway front portion and an upstanding rear portion that defines a sloping support surface angled towards the rear of the runners. Upstanding members 518, 520, 522, and 524 are pivotally connected to the brackets 516 in such manner that the members are movable between a collapsed position in which they are substantially parallel to the surface of the runners and an erected position in which their lower portions rest against the upstanding rear portions of the brackets 516.

The front upstanding members 518 and 520 are interconnected by a support mechanism, which is generally designated 526, that is similar to the support mechanism illustrated in FIG. 1. The rear upstanding members 522 and 524 are interconnected by a support mechanism, generally designated 528, that is similar to the support mechanism previously discussed in connection with FIG. 3. Since these support mechanisms have been previously discussed, further description of these support mechanisms is not considered necessary.

The sides of the foldable structure 501 are formed of horizontal side members generally designated 530, 532, 534, and 536. Side members 530 and 532 interconnect upstanding members 518 and 524, while side members 534 and 536 interconnect upstanding members 520 and 522. As can be seen from FIGS. 24 and 25, the side members are both pivotally and slidingly connected to the upstanding members. For this purpose, circular members 538 are connected by shafts 540 to ends of the side members. The circular members 538 are receivable in upper brackets 542 (FIG. 24) or lower brackets 544 (FIG. 25) connected to the upstanding members. The brackets 542 and 544 define generally vertical sliding tracks for the circular members 538. Thus, the horizontal side members are able to both rotate and translate with respect to the upstanding members. The length of the sliding tracks is such that the side members are movable during collapse of the foldable structure 501 to compensate for the thickness of component members of the sled. The lower bracket 544, as illustrated in FIG. 25, is spaced further from its upstanding member than the upper bracket 542, as illustrated in FIG. 24. In this manner, the horizontal side members are positionable parallel to each other when the foldable structure 501 is collapsed. The circular members 538 are held in the sliding tracks by suitable mechanisms, such as pins 543 inserted through upper side walls of the brackets 542 and 544 and/or spring-biased plungers 545 located at the top of the tracks. The plungers are depressed against the spring force to allow insertion and removal of the circular members 538 from the tracks. Preferably, the plungers have straight sides so that the circular members 538 cannot ride up on the plungers.

Each of the horizontal side members is formed of two horizontal members hingedly connected by a hinge mechanism of the type illustrated in FIG. 27. The hinge mechanism, which is generally designated 546, includes reinforcing collars 548 and 550 positioned on abutting ends of the horizontal members forming the side members. The reinforcing collars have downwardly extending flanged portions 552 and 554, respectively, which have their distal ends interconnected by a hinge joint 556. In order to hold the components of the side members in a horizontal position, the collar 548 includes laterally extending projections 558 that are adapted to surround at least a portion of collar 550. A locking mechanism, which is generally designated 560, has a first component 562 associated with the projections 558 and a second component 564 associated with the collar 550. The components 562 and 564 are manually or automatically engageable with each other to hold the components of the horizontal side member in the horizontal position. Also, the hinge mechanisms 546 associated with the lower horizontal side members 532 and 536 are modified to include downwardly extending flanges 566 that are engageable with the ridges 514 on the inner edges of the runners 502 and 504 to guide movement of the runners with respect to the side members during folding of the runners.

Figure 20:
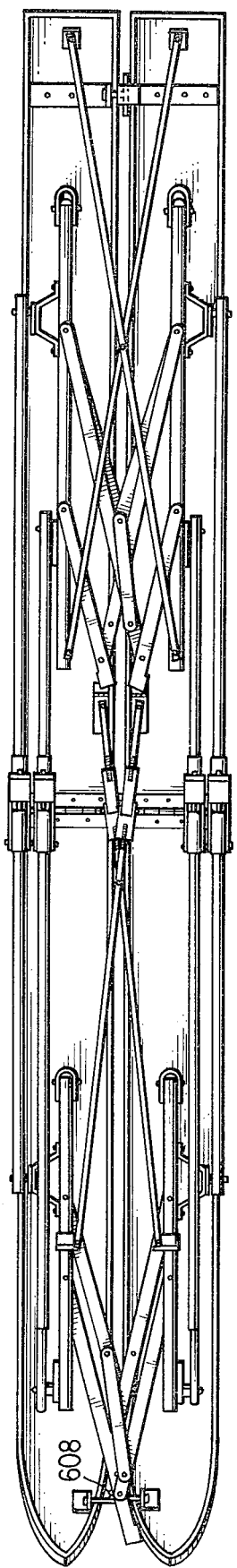
FIG. 20 is a top plan view illustrating the embodiment of FIG. 14 in a totally collapsed position.

As can be seen from FIG. 21, the hinge mechanisms 546 connecting the upper horizontal side members are displaced rearwardly from the hinge mechanisms 546 connecting the lower horizontal side members, when the foldable structure 501 is in an erect position. The positioning of the hinge mechanisms is such that they align with the hinged connections of the runners 502 and 504 when the foldable structure 501 is collapsed, as illustrated in FIG. 20.

Figure 18:
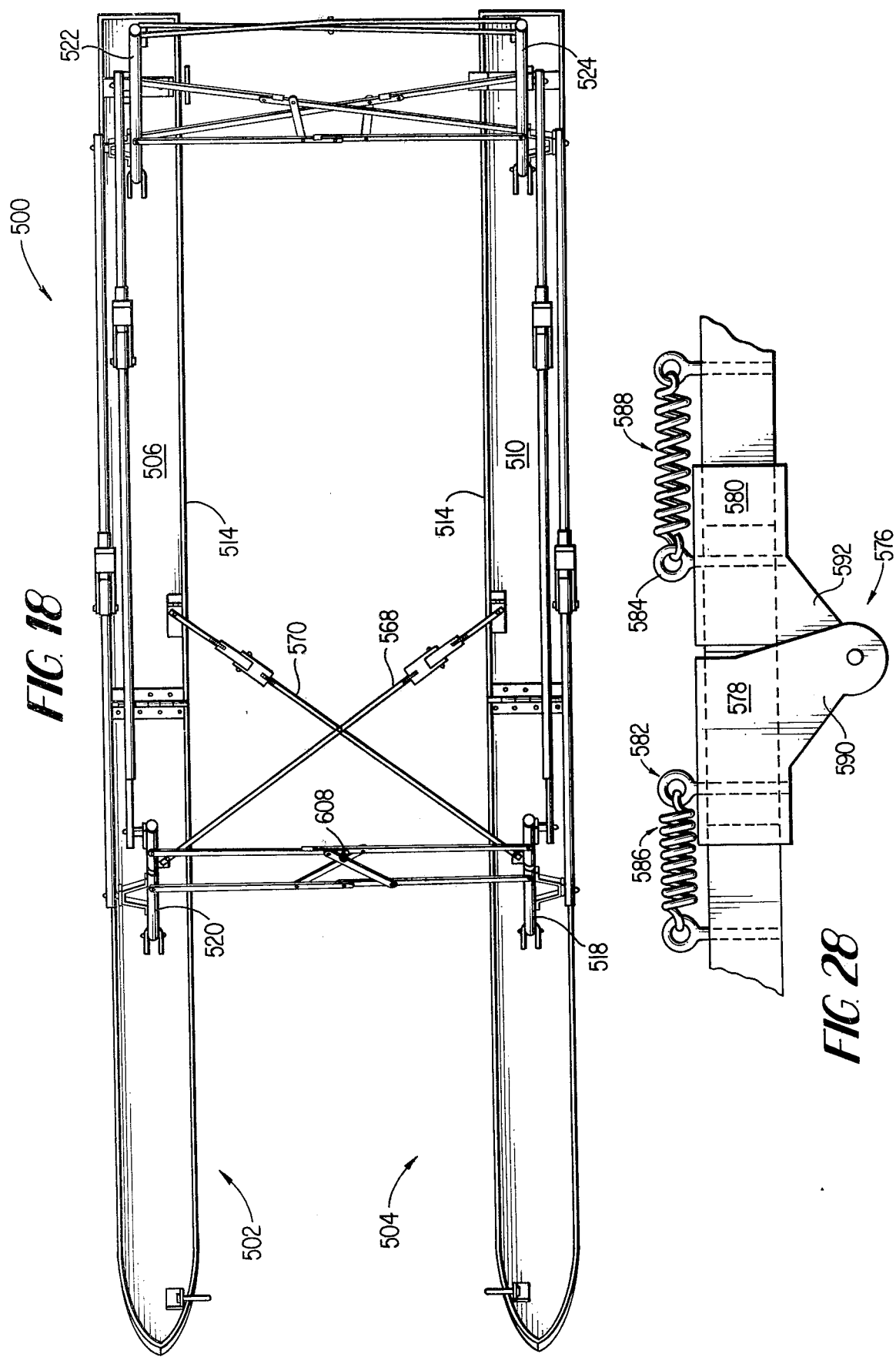
FIG. 18 is a top plan view of FIG. 14.
Figure 19:
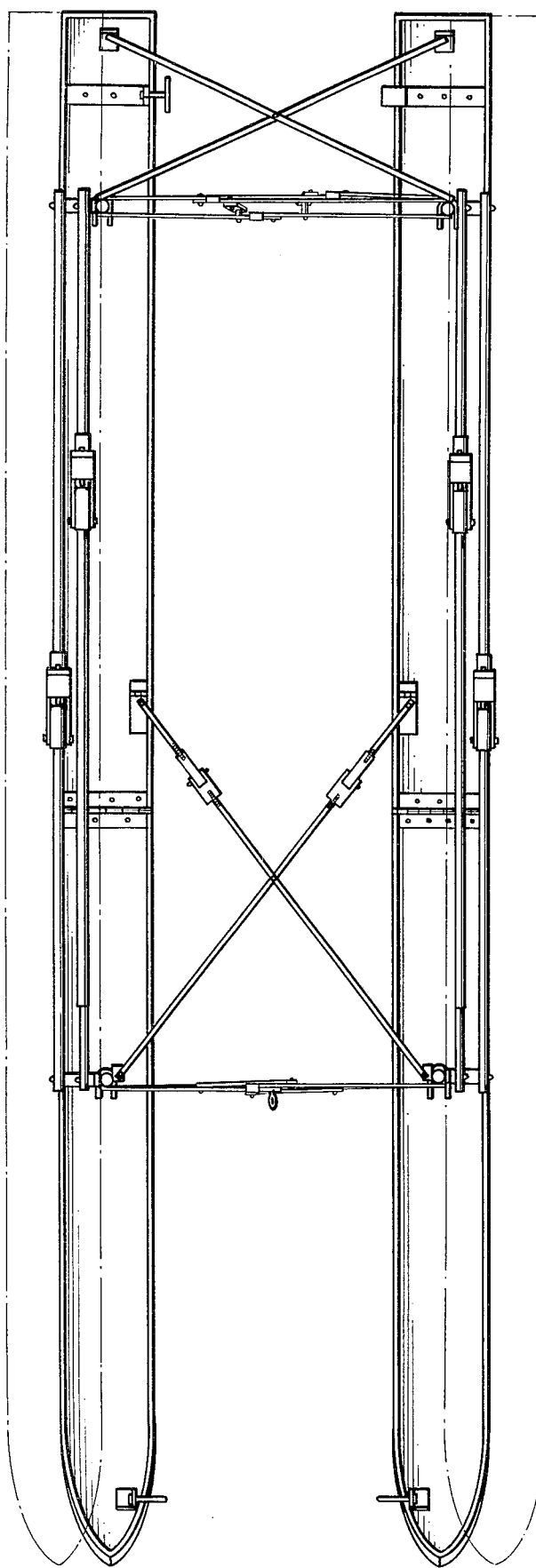
FIG. 19 is a top plan view of FIG. 15.

As can be seen from FIG. 18, the inner edges of the runners 502 and 504 are spaced from each other for a predetermined distance, such as 60 cm., when the sled 500 is in an erected position. As the sled 500 is moved from the erected position to the collapsed position illustrated in FIG. 20, the runners are automatically moved towards each other. This automatic movement is accomplished by pairs of pivotally interconnected diagonal members 568, 570 and 572, 574. The pivotal connections between diagonal members ensure conjoint movement of the runners 502 and 504 towards each other. Diagonal member 568 extends between upstanding member 520 and runner member 510, while diagonal member 570 extends between upstanding member 518 and runner member 506. Diagonal member 572 extends between upstanding member 522 and runner member 510, while diagonal member 574 extends between upstanding member 524 and runner member 506. Preferably, the diagonal members are connected to the other members by hinged pivotal connections. As can be seen from FIG. 15, the diagonal members 572 and 574 connected to the rear upstanding members 522 and 524 are positioned at a greater angle with respect to the runners than the front diagonal members 568 and 570. The angle of the front diagonal members is selected such that the members interfere to the minimum extent possible with the carrying capacity of the sled. Also, as illustrated in FIG. 15, the front diagonal members 568 and 570, extend on both sides of the hinges connecting the runner members to each other. Thus, the diagonal members 568 and 570 must also be formed of hingedly connected members. In an erected position of the foldable structure 501 (FIG. 21), the hinged connections are spaced rearwardly from the hinged connections of the runners 502 and 504 and, in the collapsed position (FIG. 20), the hinged connections of the diagonal members align with the hinged connections of the runners. While the hinge mechanism 546 used to connect the horizontal side members could also be used to connect the diagonal members, it is preferable to use another type of hinge mechanism with the diagonal members.

A hinge mechanism, which has been generally designated 576, suitable for use with the diagonal members is illustrated in FIG. 28. The hinge mechanism 576 has reinforced collars 578 and 580 slidingly connected by pins 582 and 584, respectively, positioned in longitudinally-extending slots formed in the facing ends of the members forming the diagonal members. Springs 586 and 588 have first ends connected to the collars 578 and 580, respectively, and second ends connected to the members forming the diagonal members. The collars 578 and 580 have downwardly extending flanged portions 590 and 592, respectively, interconnected at their distal ends by a hinge mechanism 594.

Preferably, a shock absorbing mechanism is positioned between the runners 502 and 504 and the foldable structure 501. For instance, as illustrated in FIG. 21, a spring 596 has a first end connected to the top surface of runner 504 at a position spaced in front of bracket 516. The other end of the spring 596 is connected to runner 504 at a position spaced rearwardly from the bracket 516. A mid portion of the spring passes through a connection member attached to upstanding member 518. Thus, spring 596 assists movement of the foldable structure 501 from a collapsed to an erected position and serves as a shock absorber during movement of the sled. A similar spring 598 is associated with runner 502 and upstanding member 520. It will be appreciated that other types of shock absorbing mechanisms can be used with the sled 500.

As illustrated in FIG. 26, the sled 500 is movable into a totally collapsed, folded, and locked position. In this position, the sled forms a compact, easily transportable package. A locking mechanism, which is generally designated 600, is provided to hold the sled 500 in the collapsed and folded position. The locking mechanism includes rings 602 positioned on front surfaces of the runner members 508 and 512; an upstanding bracket 604, as illustrated in FIG. 22, positioned on the rear of runner member 510; and an S-shaped member 606, as illustrated in FIG. 23, positioned on a rear surface of runner member 506. A ring member 608 extends forwardly from the front support mechanism 526. When the sled 500 is in the collapsed position illustrated in FIG. 20, the members 602 and 608 and the members 604 and 606 are in alignment with each other. When the sled is moved into the position illustrated in FIG. 26, a first portion 610 of the S-shaped member 606 engages and locks together the members 602 and 608. Simultaneously, a second portion 611 of the S-shaped member 606 engages the bracket 604. Thus, the S-shaped member interlocks the runner members 506, 508, 510, and 512 with the foldable structure 501.

Numerous modifications of the sled 500 of the present invention are contemplated. For instance, in one modification, a rearwardly and downwardly extending guide surface is connected to the front support mechanism 526. The guide surface ensures that the sled 500 rides up and over any obstacles encountered during movement of the sled. In another modification, the horizontal side members 530, 532, 534 and 536 are removed from the brackets 542 and 544 and rigid side members are positioned in their place. Similarly, diagonal members 568 and 570 and runners 502 and 504 are replaced with rigid members. It will be appreciated that this embodiment is collapsible to reduce its height or width but not foldable to reduce its length. This embodiment is useful as a child's sled with a relatively low support mechanism forming the front of the sled and a relatively high support mechanism forming the back of the sled. The sled is covered with canvas or other suitable material that supports a seated child. Another modification uses a different front support mechanism 526 and/or a different rear support mechanism 528. One embodiment of such a support mechanism is illustrated in FIG. 30.

FIG. 30 illustrates a support mechanism, generally designated 620, having an upper horizontal member 622 and a lower horizontal member 624 interconnecting upstanding members 518 and 520. The upper horizontal member 622 is formed of members 626 and 628 pivotally connected to each other at 630. The lower member 624 is formed of two members 632 and 634 having ends pivotally connected to each other at 636. One of the horizontal members has its component members modified to hold the member in a desired angular position. Preferably, the angular position is either horizontal or slightly below horizontal. Also, a support member 638 interconnects the connection points 630 and 636, so that the members 622 and 624 move together during erection and collapse of the sled and so that forces exerted on the upper member are transmitted to the lower member. Preferably, the upper end of support member 638 extends above the connection 630 and is bent back on itself to form a ring-shaped member 640. The ring-shaped member 640 is used for both towing the sled and to assist in moving the support mechanism 620 from a collapsed to an erected position.

The preceding variations of the present invention are merely illustrative of possible modifications. It will be understood that other variations and modifications can be effected with in the spirit and scope of the invention.

What is claimed is:

1. A collapsible support structure having first and second substantially parallel members interconnected by a collapsible support mechanism, the support mechanism being movable between a collapsed position in which said parallel members are closely spaced from each other and an erected position in which said parallel members are spaced a greater distance apart from each other and held in an upright position, the support mechanism, in the erected position, comprising:

a member substantially perpendicular to the parallel members having ends pivotally connected to portions of said parallel members, said perpendicular member being formed of two component members having distal ends pivotally connected to the parallel members and proximal ends pivotally connected to each other;

two diagonal members for transferring forces exerted on one of the parallel members to the other parallel member, one of said diagonal members extending from a lower portion of said second parallel member to an upper portion of said first parallel member, the other of said diagonal members extending from a lower portion of said first parallel member to an upper portion of said second parallel member, each of said diagonal members having a longer component member pivotally connected to a shorter component member, distal ends of said shorter and longer component members being pivotally connected to said parallel members, with the distal end of the longer component members being pivotally connected to a respective one of said parallel members at or near the connection of the said perpendicular member to the said parallel member; and support members for interconnecting said perpendicular member and said diagonal members, one of said support members having a first end pivotally connected to said longer component member of said one of said diagonal members and a second end pivotally connected to the perpendicular component member connected to said first parallel member, another of said support members having a first end pivotally connected to said longer component member of said other diagonal members and a second end pivotally connected to the perpendicular component member connected to said second parallel member, at least one of said component members including means for holding said component members in a predetermined position when the support mechanism is in an erected position.

2. A collapsible support structure as claimed in claim 1 wherein at least one of said component members includes means for limiting movement of the component member when the component member is moved towards one of the parallel members during collapse of the support structure.

3. A collapsible support structure as claimed in claim 1 or 2 wherein at least one of said support members includes a portion bent away from the plane of the horizontal member so that an upper portion of at least one of said diagonal members is spaced from the plane of the horizontal member.

4. A collapsible folding device comprised of a plurality of collapsible support structures, each of said collapsible support structures having a. a first and a second support member positionable in an upright position, and b. a collapsible support mechanism interconnecting the support members and movable between a collapsed position in which the support members are adjacent to each other and an erected position in which the support members are spaced apart from each other, one of said support structures having a collapsible support mechanism comprising:

(1) a first member comprised of a pair of pivotally interconnected component members, distal ends of the component members being pivotally interconnected to lower portions of the support members and proximal ends being pivotally interconnected to each other;

(2) a second member extending from a lower portion of the first support member to an upper portion of the second support member;

(3) a third member extending from a lower portion of the second support member to an upper portion of the first support member, said second and third members being adapted to transmit forces between said support members, each of said second and third members having lower and upper component members with distal ends pivotally connected to the support members and proximal ends pivotally connected to each other, one of said component members including means for holding said component members in a predetermined position when said folding device is erected;

(4) a first support element positioned between and pivotally connected to the lower component member of said second member, and the component member of said first member closest to said second support member; and (5) a second support element positioned between and pivotally connected to the lower component member of said third member and the component member of said first member closest to said first support member.

5. A collapsible support structure as claimed in claim 4 wherein.

a second of said support structures has a collapsible support mechanism comprising:

(1) a first element having ends pivotally connected to upper portions of the support members;

(2) a second element having ends pivotally connected to lower portions of the support members, each of said first and said second elements having two component members with distal ends pivotally connected to the support members and proximal ends pivotally connected to each other at a point spaced approximately equidistant between the support members, at least one of said two component members including means for maintaining said component members in a predetermined position when said folding device is erected; and (3) diagonal support elements positioned between said first and second elements and having upper ends pivotally connected to the first element on both sides of the point of connection of the proximal ends of the component members and lower ends pivotally connected to the second element on opposite sides of the point of connection of the proximal ends of the component members.

6. A collapsible folding device according to claim 5 wherein the device is a chair, wherein the first of said support structures forms the back of the chair, wherein the second of said support structures forms the front and sides of the chair, and wherein adjacent portions of adjacent support structures use the same support member.

7. A collapsible folding device according to claim 5 wherein the device is a chair, wherein the first of said support structures forms the back of the chair, wherein the second of said support structures forms the front of the chair, and wherein the sides of the chair are formed of fixed length members pivotally interconnecting the support members forming the front and back of the chair.

8. A collapsible folding device according to claim 5 wherein the device is a chair, wherein the back of the chair has a lower portion formed by the second of said support structures, an upper portion superposed on the lower portion and formed by the first of said support structures, facing ends of the support members used in the superposed support structures being pivotally connected to each other so that the height and width of the back of the chair is reduced when the chair is collapsed.

9. A collapsible folding device according to claim 8 wherein the front of the chair has a lower portion formed by the second of said support structures so that the width of the front of the chair is reduced when the chair is collapsed, the front of the chair being pivotally connected to the back of the chair by fixed length members.

10. A collapsible folding device according to claim 8 wherein each of the collapsible support structures includes means for biasing the support structures into erected positions.

11. A collapsible folding device according to claim 10 further comprising locking means for holding the chair in a collapsed position.

12. A collapsible folding device according to claim 5 wherein the device is a sled collapsible and foldable in height and in width, the sled having a pair of spaced-apart foldable runners and a collapsible and foldable structure pivotally connected to the runners for pivotal movement about axes extending transversely to the longitudinal axes of the runners, the support members of said collapsible support structures forming the members of said collapsible and foldable structure connected to the runners, said first support structure forming the back and said second support structure forming the front of said collapsible and foldable structure.

13. A collapsible folding device according to claim 12 wherein the collapsible and foldable structure further comprises side members interconnecting the support members forming the front and back of the sled.

14. A collapsible folding device according to claim 12 wherein the collapsible and foldable structure further comprises diagonal members interconnecting each of said runners with the support members not pivotally connected thereto so that pivotal movement of said support members towards said runners moves said runners towards each other, said diagonal members being adapted to support said support members in upright positions.

15. A collapsible folding device according to claim 13 wherein the collapsible and foldable structure further comprises diagonal members interconnecting each of said runners with the support members not pivotally connected thereto so that pivotal movement of said support members towards said runners moves said runners towards each other, said diagonal members being adapted to support said support members in upright positions.

16. A collapsible folding device according to claim 14 or 15 wherein the diagonal members supporting the support members of the front of the sled are foldable, and wherein the runners, side members and foldable diagonal members are foldable about a common axis when the collapsible and foldable structure is collapsed.

17. A collapsible support structure comprising:
a. a first and a second support member positionable in an upright position, and
b. a collapsible support mechanism interconnecting the support members and movable between a collapsed position in which the support members are adjacent to each other and an erected position in which the support members are spaced apart from each other,
said collapsible support mechanism comprising:
  (1) a first member comprised of a pair of pivotally interconnected component members, distal ends of the component members being pivotally interconnected to lower portions of the support members and proximal ends being pivotally interconnected to each other;
  (2) a second member extending from a lower portion of the first support member to an upper portion of the second support member;
  (3) a third member extending from a lower portion of the second support member to an upper portion of the first support member;
said second and third members being adapted to transmit forces between said support members, each of said second and third members having lower and upper component members with distal ends pivotally connected to the support members and proximal ends pivotally connected to each other;
one of said component members including means for holding said component members in a predetermined position when said folding device is erected;
  (4) a first support element positioned between and pivotally connected to the lower component member of said second member, and the component member of said first member closest to said second support member; and (5) a second support element positioned between and pivotally connected to the lower component member of said third member and the component member of said first member closest to said first support member.

18. The collapsible support structure of claim 17 wherein the pivotal connection of said first, said second, and said third members to the lower portions of said support members are conjoint.

19. In a foldable chair movable between an erected position and a folded position, the chair having a seat supported by a pair of front legs, a pair of rear legs, side members pivotally interconnecting the front and rear legs, and a back supported by first and second upstanding side members pivotally connected to the pair of rear legs, the front legs and rear legs being moved towards each other during folding of the chair, the improvement wherein said seat and said back are collapsible to reduce the width of the folded chair, the pair of front legs being interconnected to each other and the pair of rear legs being interconnected to each other by a first collapsible support mechanism having a first member formed of two pivotally interconnected elements pivotally connected to lower portions of the legs; a second member formed of two pivotally interconnected elements pivotally connected to upper portions of the legs, the pivotal interconnection of the elements being located approximately halfway between the legs, the elements of one of said first and said second members including means for holding said members in a predetermined position in the erected position of the chair; a third member having one end pivotally connected to the first member on one side of the pivotal interconnection and the other end pivotally connected to the second member on the other side of the pivotal interconnection; and a fourth member forming an x-shape with the third member in the erected position of the chair and having one end pivotally connected to the first member on the other side of the pivotal interconnection and the other end pivotally connected to the second member on the one side of the pivotal interconnection; and the upstanding side members of the back being interconnected to each other by a second collapsible support mechanism having a first member formed of first and second elements having proximal ends pivotally interconnected to each other approximately halfway between the upstanding side members and distal ends pivotally interconnected to lower portions of the upstanding side members; a second member formed of third and fourth elements having proximal ends pivotally interconnected to each other at a point spaced above said first element and positioned intermediate the pivotal interconnection of the first and second elements and the first upstanding side member, the distal end of said third element being pivotally interconnected to an upper portion of the first upstanding side member and the distal end of said fourth element being pivotally interconnected to a lower portion of the second upstanding side member; a third member formed of fifth and sixth elements having proximal ends pivotally interconnected to each other at a point spaced above said second element and positioned intermediate the pivotal interconnection of the first and second elements and the second upstanding side member, the distal end of said fifth element being pivotally interconnected to an upper portion of the second upstanding side member and the distal end of said sixth element being pivotally interconnected to a lower portion of the first upstanding side member, one of said elements including means for holding said elements in a predetermined position when the chair is in an erected position; a fourth member having one end pivotally connected to said first element and one end pivotally connected to said fourth element; and a fifth member having one end pivotally connected to said second element and one end pivotally connected to said sixth element.

20. The improvement of claim 19 wherein the pivotal connections of said distal ends of said elements to said upstanding side members are conjoint.

21. The improvement of claim 19 wherein the pairs of front and rear legs are foldable underneath the seat and the back is foldable on top of the seat.

22. The improvement of claim 19, 20 or 21 wherein one of said elements of said second collapsible support mechanism includes means for limiting movement of said elements with respect to said upstanding side members when the chair is collapsed.

* * * * *